No. 695,071. Patented Mar. 11, 1902.
H. O. MOONEY.
PIPE COUPLING.
(Application filed Feb. 20, 1901.)
(No Model.)
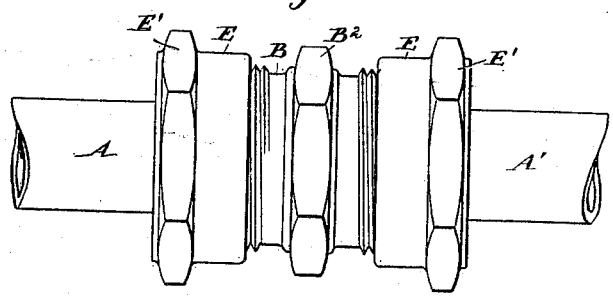
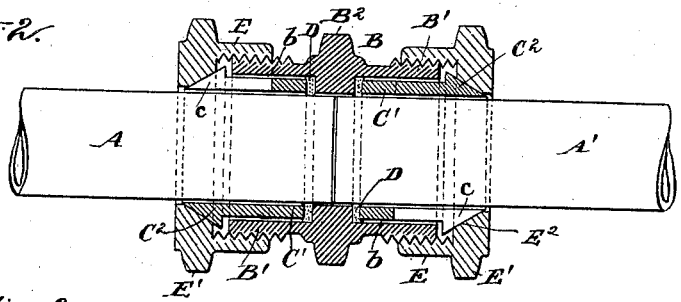
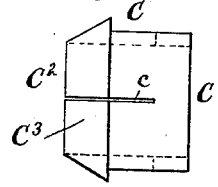 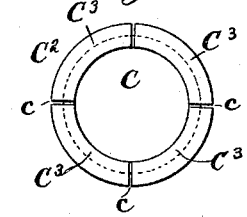 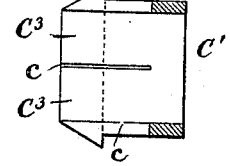
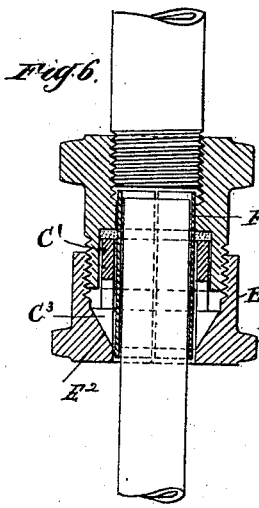 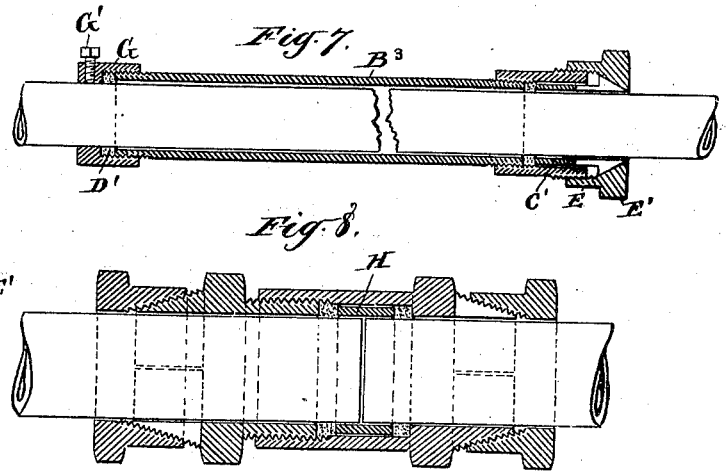
Witnesses:
Joseph Rizzolo.
Geo. W. Case Jr.
Inventor:
Herman O. Mooney,
by his attorney
Charles R. Searle.
THE NORRIS PETERS CO., PHOTO-LITHO., WASHINGTON, D. C.

UNITED STATES PATENT OFFICE.

HERMAN O. MOONEY, OF FARMINGTON, NEW HAMPSHIRE.

PIPE-COUPLING.

SPECIFICATION forming part of Letters Patent No. 695,071, dated March 11, 1902.

Application filed February 20, 1901. Serial No. 48,051. (No model.)

*To all whom it may concern:*

Be it known that I, HERMAN O. MOONEY, a citizen of the United States, residing at Farmington, in the county of Strafford and State of New Hampshire, have invented a certain new and useful Improvement in Pipe-Couplings, of which the following is a specification.

The improved coupling is intended to serve in joining the adjacent ends of steam or water pipes and like tubes for other purposes, and is adapted for service in a variety of situations, notably as a substitute for the usual wiped joint, and also as a means for easily and quickly repairing a fracture by joining the ends of the broken pipe.

The accompanying drawings form a part of this specification and show the invention as I have carried it out.

Figure 1 is a side elevation showing the improved coupling in position on a horizontal pipe. Fig. 2 is a corresponding longitudinal section. Fig. 3 is a side view of the gland alone. Fig. 4 is a corresponding longitudinal section, and Fig. 5 is an end view. Figs. 6, 7, and 8 are longitudinal sections showing modifications.

Similar letters of reference indicate the same parts in all the figures.

Referring to Figs. 1 to 5, inclusive, A A' are the adjacent ends of two pipes to be joined, and B is a peculiarly-formed sleeve inclosing the ends and extending a short distance in both directions from the line of separation. The ends B' B' of the sleeve are recessed at $b$ and screw-threaded exteriorly. At the center is a squared or hexagonal portion $B^2$, adapted to receive a wrench. The recesses receive each a thimble or gland C, cylindrical at one end C' and having a conical head $C^2$ on the other or outer end. The cylindrical portion of each matches to and is received in one of the recesses $b$, upon suitable packing D therein, which when compressed makes a tight joint between the pipe end and sleeve, as will be understood. The conical end $C^2$ of each gland is divided by four or other number of radial cuts $c$, extending from the end into the cylindrical portion C', thus forming four fingers $C^3$, adapted to grasp the pipe end when forced inward by the application of a nut E, having an interior conical face $E^2$, matching to the conical end $C^2$ of the corresponding gland C and screw-threaded interiorly to match the threads on the sleeve B. Each nut E is also provided with a squared or hexagonal portion E' to receive a wrench.

In applying the coupling the pipe ends are sufficiently separated to allow a nut E and gland C to be placed upon each end in the order named, and, lastly, the sleeve B, with its packing-rings D D, is similarly placed in position on one of the ends. The latter are then brought into line, with their faces as near together as practicable, and the sleeve slipped over the junction into a position about central thereto. The glands are then entered in their respective recesses $b$, and, lastly, the recessed nuts E E are screwed down to insure that the packing is tightly compressed and the coupling firmly secured to the pipe ends. As the nuts E are turned down the first effect is to carry with them the glands C until the resistance offered by the packing is sufficient to arrest the movement in that direction. At that stage the conical interior of each nut acting upon the conical head of its gland forces the fingers $C^3$ strongly inward from all sides against the pipe end, and the whole is thus firmly held.

The improved coupling is easily and quickly applied and removed and serves efficiently. It may be nickeled or otherwise plated or ornamented to correspond to the other portions of the exposed plumbing in high-class work.

The invention may serve in a variety of situations, but is especially designed to take the place of the usual wiped joint in plumbing-work where the joint may require to be subsequently broken—as, for instance, in joining the trap to the waste for a hand-basin or bath-tub liable to become obstructed and difficult to clear.

The sleeve may have but one recess and packing-ring and be applied to one pipe end by screwing thereto, as shown in Fig. 6, the junction with the other pipe end being as above described.

In case the pipe ends are for any reason dissimilar in size the difference may be made up by the application of thin semicylindrical bushings F to the smaller. These bushings may be of varying thicknesses adapted to fill the annular space between the pipe ends and sleeve, and thus hold the ends firmly in line. Fig. 6 shows a bushing applied. Similar bushings may be applied within the glands C to insure a firm grasp by the fingers C³.

Fig. 7 shows a form especially adapted to repair a fracture. An auxiliary sleeve B³, which may be a short length of pipe inclosing the ends at each side of the break, is screw-threaded exteriorly to receive a sleeve similar to B and its equipments. As shown in Fig. 7, but one end of the auxiliary sleeve is thus arranged, the other end receiving a cylindrical cap G, containing packing D' and screw-threaded to match to the auxiliary sleeve. The cap is provided with a set-screw G' for securing it.

Fig. 8 shows a modification in which the sleeve is made with a slitted conical portion at one end compressed by a nut and is recessed to receive two packing-rings separated by a ferrule H. Both rings are compressed by a gland screwed into the sleeve-recess and having a conical portion screw-threaded on the exterior to receive a nut corresponding to the nut E and serving to compress the fingers on the conical portion firmly to the pipe.

I claim—

1. In a pipe-coupling of the character set forth, a sleeve adapted to inclose a pipe end and having an internal annular recess adapted to receive packing, a gland received in said recess and means for compressing it upon said packing, a conical portion integral with said gland having fingers formed by slitting said conical portion, said fingers being all connected to the body portion of the gland for a portion of their length and a conically-recessed nut engaging said sleeve and adapted to engage said fingers and force the latter into strong frictional contact with said pipe end, all combined and arranged to serve substantially as herein specified.

2. In a pipe-coupling of the character set forth, a sleeve adapted to inclose a pipe end and having an internal annular recess at each end adapted to receive packing, a gland received in said recess and serving to compress said packing, a conical portion integral with said gland, fingers all joined to the body portion of the gland and formed by slitting said conical portion of said gland, and a conically-recessed nut matching to said conical portion and to the exterior of said sleeve on the extremity of which latter it is screwed, adapted to perform the double function of forcing said gland to said packing and also forcing said fingers into strong frictional contact with said pipe end, all combined and arranged to serve substantially as herein specified.

3. The sleeve B threaded exteriorly at each end and having the interior annular recesses b b and packing D therein, a gland C for each end having a cylindrical portion C' adapted to compress said packing and a conical portion C² having the fingers C³, and a conically-recessed nut E for each gland engaging said sleeve, all combined and arranged to serve with two adjacent pipe ends substantially as and for the purposes herein specified.

4. The exteriorly-threaded sleeve having interior annular recesses, glands having tubular portions extending within said recesses to compress packing at the inner ends thereof, and slitted conical portions, and nuts engaging said sleeve and having conically-recessed outer ends to receive the conical portions of the glands and adapted to compress the latter as the nuts are screwed on, as set forth.

In testimony that I claim the invention above set forth I affix my signature in presence of two witnesses.

HERMAN O. MOONEY.

Witnesses:
CHARLES M. CROSBY,
HOLLIS B. PEARL.